(12) United States Patent
Kaufman et al.

(10) Patent No.: US 8,341,401 B1
(45) Date of Patent: Dec. 25, 2012

(54) INTEROPERABLE CRYPTOGRAPHIC PEER AND SERVER IDENTITIES

(75) Inventors: Matthew Kaufman, Bonny Doon, CA (US); Michael Thornburgh, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1261 days.

(21) Appl. No.: 12/120,229

(22) Filed: May 13, 2008

(51) Int. Cl.
*H04L 29/06* (2006.01)

(52) U.S. Cl. ........ 713/158; 713/155; 713/156; 713/176; 726/19

(58) Field of Classification Search .................. 709/224; 713/155, 176
See application file for complete search history.

(56) References Cited

U.S. PATENT DOCUMENTS

| | | | |
|---|---|---|---|
| 4,475,192 A | 10/1984 | Fernow et al. | |
| 5,774,660 A | 6/1998 | Brendel et al. | |
| 5,857,072 A | 1/1999 | Crowle | |
| 6,138,120 A | 10/2000 | Gongwer et al. | |
| 6,338,089 B1 | 1/2002 | Quinlan | |
| 6,563,793 B1 | 5/2003 | Golden et al. | |
| 7,039,916 B2 | 5/2006 | Jason, Jr. | |
| 7,111,162 B1 | 9/2006 | Bagepalli et al. | |
| 7,246,356 B1 | 7/2007 | Lozben et al. | |
| 7,274,706 B1 | 9/2007 | Nguyen et al. | |
| 7,305,486 B2 | 12/2007 | Ghose et al. | |
| 7,403,945 B2 | 7/2008 | Lin et al. | |
| 7,448,080 B2 | 11/2008 | Karjala et al. | |
| 7,600,113 B2 * | 10/2009 | Kuehnel et al. | ............... 713/155 |
| 7,603,454 B2 | 10/2009 | Piper et al. | |
| 2002/0010783 A1 | 1/2002 | Primak et al. | |
| 2002/0065912 A1 * | 5/2002 | Catchpole et al. | ............ 709/224 |
| 2003/0135625 A1 | 7/2003 | Fontes et al. | |
| 2003/0163702 A1 | 8/2003 | Vigue et al. | |
| 2004/0039906 A1 * | 2/2004 | Oka et al. | ....................... 713/156 |
| 2004/0064568 A1 | 4/2004 | Arora et al. | |
| 2004/0193461 A1 | 9/2004 | Keohane et al. | |
| 2004/0268142 A1 | 12/2004 | Karjala et al. | |
| 2005/0097222 A1 | 5/2005 | Jiang et al. | |
| 2005/0198634 A1 | 9/2005 | Nielsen et al. | |
| 2006/0041745 A1 | 2/2006 | Parnes | |
| 2006/0101081 A1 | 5/2006 | Lin et al. | |
| 2006/0215652 A1 | 9/2006 | Strandridge et al. | |
| 2006/0248195 A1 | 11/2006 | Toumura et al. | |
| 2006/0256711 A1 | 11/2006 | Kusama et al. | |

(Continued)

OTHER PUBLICATIONS

Badra, "Key-Exchange Authentication Using Shared Secrets", 2006, IEEE Computer Society, p. 58-66, vol. 39, Iss 3.*

(Continued)

*Primary Examiner* — David Pearson
*Assistant Examiner* — Gregory Lane
(74) *Attorney, Agent, or Firm* — Fish & Richardson P.C.

(57) ABSTRACT

Techniques for interoperable cryptographic peer and server identities can include receiving a message, in a connection establishment transaction, from an endpoint, the message including an endpoint discriminator, selecting a certificate based on the endpoint discriminator, determining a cryptographic scheme based on the selected certificate, and establishing the requested connection with the endpoint using the determined cryptographic scheme. The techniques can also include accessing one or more hashes, each hash being a hash of at least a portion of a certificate, processing the endpoint discriminator for an identity object, and comparing the identity object with the one or more hashes to identify a matching hash. The selected certificate can correspond to the matching hash. These techniques can allow an endpoint to interoperate with other endpoints that use different or similar cryptographic schemes.

17 Claims, 5 Drawing Sheets

U.S. PATENT DOCUMENTS

| | | | |
|---|---|---|---|
| 2007/0086357 | A1 | 4/2007 | Okmianski et al. |
| 2007/0234422 | A1* | 10/2007 | Piesing .......................... 726/19 |
| 2007/0234428 | A1 | 10/2007 | Rash et al. |
| 2008/0040226 | A1 | 2/2008 | Roker |
| 2008/0075048 | A1 | 3/2008 | Suszko |
| 2008/0280623 | A1 | 11/2008 | Danne et al. |
| 2008/0301219 | A1 | 12/2008 | Thornburgh et al. |
| 2009/0024739 | A1 | 1/2009 | Thornburgh et al. |
| 2009/0150534 | A1 | 6/2009 | Miller et al. |
| 2009/0164774 | A1* | 6/2009 | Sherkin .......................... 713/155 |
| 2009/0249074 | A1* | 10/2009 | Madhavan et al. ............ 713/176 |
| 2009/0287826 | A1 | 11/2009 | Kaufman et al. |
| 2010/0015960 | A1 | 1/2010 | Reber |

OTHER PUBLICATIONS

Federal Information Processing Standards "Secure Hash Standard" Publication 180-2, Aug. 1, 2002, downloaded from the internet at http://csrc.nist.gov/publications/fips/fips180-2/fips180-2.pdf on May 9, 2008, 75 pages.

Housley, "Internet X.509 Public Key Infrastructure Certificate and Certificate Revocation List (CRL) Profile", Apr. 2002, downloaded from the internet at http://www.ietf.org/rfc/rfc3280.tx?number=3280 on Dec. 5, 2007, 127 pages.

International Standards Organization "ISO/IEC 9796-2 Information Technology, Security Techniques, Digital Signature Schemes, Giving Message Recovery" International Organization for Standards ISO/IEC 9796-2:2002/Amd.1:2008, Oct. 1, 2002 and Amendment of Jan. 15, 2008, 61 pages.

Kaufman, et al. "The Secure Media Flow Protocol—Version 1" Amicima, Inc., 2004, downloaded from the internet at http://web.archive.org/web/20060211083929/www.amicima.com/downloads/documentation/protocol-doc-20051216.txt on Apr. 10, 2007, 14 pages.

Rescorla, "Diffie-Hellman Key Agreement Method", Network Working Group, Request for Comments: 2631, Jun. 1999, downloaded from the internet at http://www.ietf.org/rfc/rfc263.txt on May 13, 2008, 13 pages.

RSA Security, Inc. "PKCS #1 v.2.1: RSA Cryptography Standard", downloaded from the internet at http://www.rsa.com/rsalabs/node.asp? id=2125 on May 13, 2008, 61 pages.

Thornburgh, et al. "Endpoint Discriminator in Network Transportation Protocol Startup Packets", U.S. Appl. No. 11/779,165, filed Jul. 17, 2007, 32 pages.

http://en.wikipedia.org/wiki/Gnutella, May 5, 2008, 8 pages.

http://en.wikipedia.org/wiki/BitTorrent_%28protocol%29, May 5, 2008, 13 pages.

http://en.wikipedia.org/wiki/Kazaa, May 3, 2008, 7 pages.

Cooper, D., et al., "Internet X.509 Public Key Infrastructure Certificate and Certificate Revocation List (CRL) Profile," Standards Track, Network Working Group, May 2008, 151 pages.

Menezes et al., "Handbook of Applied Cryptography," CRC Press, 321-383 (1996), 64 pages.

Patent Application, filed Feb. 20, 2008, for related U.S. Appl. No. 12/034,649, to be published by the USPTO, 29 pages.

Patent Application, filed Jan. 3, 2008, for related application No. 11/969,186, to be published by the USPTO, 22 pages.

International Search Report and Written Opinion, mailed Jan. 28, 2010 in related matter PCT/US08/063739, 7 pages.

International Search Report and Written Opinion, mailed Jun. 27, 2008 in related matter PCT/US08/053865, 14 pages.

International Search Report and Written Opinion, mailed Jun. 29, 2009 in related matter PCT/US09/43824, 7 pages.

Patent Application, Jun. 1, 2007, for related U.S. Appl. No. 11/757,126, to be published by the USPTO, 31 pages.

Gupta et al., "A Client Oriented, IP Level Redirection Mechanism," 1999, IEEE, pp. 1461-1469, 9 pages.

* cited by examiner

INTEROPERABLE CRYPTOGRAPHIC PEER AND SERVER IDENTITIES

BACKGROUND

The present disclosure relates to interoperable cryptographic peer and server identities.

Communication systems such as peer-to-peer and client-server systems can use public keys in establishing connections between endpoints of the system. Public keys can also be used to encrypt data sent between endpoints. Public keys and corresponding private keys can be generated in accordance with a cryptographic scheme such as Diffie-Hellman (DH) or Rivest Shamir Adleman (RSA) key agreement.

SUMMARY

This specification describes technologies that, among other things, allow for interoperable cryptographic peer and server identities.

The subject matter described can be implemented in methods that include receiving a message, in a connection establishment transaction, from an endpoint, the message including an endpoint discriminator; selecting a certificate based on the endpoint discriminator; determining a cryptographic scheme based on the selected certificate; and establishing the requested connection with the endpoint using the determined cryptographic scheme. Other embodiments of this aspect include corresponding systems, apparatus, and computer program products.

These, and other aspects, can include one or more of the following features. The selecting can include accessing one or more hashes, each hash being a hash of at least a portion of a certificate; processing the endpoint discriminator for an identity object; and comparing the identity object with the one or more hashes to identify a matching hash. The selected certificate can correspond to the matching hash. The establishing can include generating an ephemeral public key in accordance with the determined cryptographic scheme; and sending the ephemeral public key to the endpoint. The selected certificate can include a static public key, the static public key being in accordance with the determined cryptographic scheme. The determined cryptographic scheme can include Diffie-Hellman key agreement Rivest Shamir Adleman (RSA) key agreement.

The subject matter described can also be implemented in methods that include obtaining an identity object of an endpoint, generating a message for a connection establishment transaction, the message including data based on the identity object; sending the message to the endpoint; receiving a message from the endpoint, the received message including a certificate, the certificate being indicative of a cryptographic scheme employed by the endpoint; and continuing the connection establishment transaction using the cryptographic scheme employed by the endpoint. Other implementations can include corresponding systems, apparatus, and computer program products.

These, and other aspects, can include one or more of the following features. The features can include generating a hash from at least a portion of the certificate; and comparing the hash with the identity object. The continuing can be conditioned upon a result of the comparison. The received certificate can include a static public key, the static public key being in accordance with the cryptographic scheme. The continuing can include receiving an ephemeral public key from the endpoint, the ephemeral public key being in accordance with the cryptographic scheme. The determined cryptographic scheme can include Diffie-Hellman key agreement or Rivest Shamir Adleman (RSA) key agreement.

The subject matter described can be implemented in a system that can include a communication network, a first endpoint communicatively coupled with the communication network, and a second endpoint communicatively coupled with the communication network. The second endpoint can include a second processor. The second processor can be configured to perform operations that include obtaining an identity object of the first endpoint; generating a first message for a connection establishment transaction, the first message including an endpoint discriminator based on the identity object; sending the first message to the first endpoint; receiving a second message from the first endpoint, the second message including a first certificate, the first certificate being indicative of a cryptographic scheme employed by the first endpoint; and continuing the connection establishment transaction using the cryptographic scheme employed by the first endpoint. The first endpoint can include a first processor. The first processor can be configured to perform operations that include receiving the first message, in the connection establishment transaction, from the second endpoint; selecting a certificate based on the endpoint discriminator of the first message; determining a cryptographic scheme based on the selected certificate; and establishing the requested connection with the second endpoint using the determined cryptographic scheme.

This, and other aspects, can include one or more of the following features. The selecting can include accessing one or more hashes, each hash being a hash of at least a portion of a certificate; processing the endpoint discriminator for an identity object; and comparing the identity object with the one or more hashes to identify a matching hash, wherein the selected certificate corresponds to the matching hash. Establishing the requested connection can include generating an ephemeral public key in accordance with the determined cryptographic scheme; and sending the ephemeral public key to the endpoint. The selected certificate can include a static public key, the static public key being in accordance with the determined cryptographic scheme. The determined cryptographic scheme can include Diffie-Hellman key agreement or Rivest Shamir Adleman (RSA) key agreement. The second processor can be configured to perform operations further including generating a hash from at least a portion of the certificate of the second message; and comparing the hash with the obtained identity object. The continuing can be conditioned upon a result of the comparison.

Particular implementations of the subject matter described in this specification may be implemented to realize one or more of the following potential advantages. The described subject matter can allow an endpoint to interoperate with other endpoints that use different cryptographic schemes. Identity objects can be associated with different cryptographic schemes, endpoints, and public keys. These identity objects can interoperate with each other in the system. The identity object can be used to authenticate an endpoint in a connection establish transaction which can reduce computational overhead. An endpoint can use one or more cryptographic schemes that are best suited for the endpoint.

The details of one or more implementations are set forth in the accompanying drawings and the description below. Other features and advantages will become apparent from the description, the drawings, and the claims.

BRIEF DESCRIPTION OF THE DRAWINGS

Like reference numbers and designations in the various drawings indicate like elements.

DETAILED DESCRIPTION

In a communication system, such as a combined peer-to-peer and client-server communication system, endpoints can establish encrypted communication sessions and connections, without a public-key infrastructure for authentication, by using one or more cryptographic schemes such as DH or RSA key agreement mechanisms and ephemeral and static variations thereof. These cryptographic schemes can provide different tradeoffs between long-term security and anti-forgery protection. Ephemeral cryptographic keying schemes can offer increased protection against key re-use attacks. Static cryptographic keying schemes can offer increased protection against forgery and lower computational overhead by not generating a public key for each connection. In some implementations, a server can prefer longer-term security and a peer can prefer anti-forgery protection. Accordingly, a server can use ephemeral cryptographic keying schemes and a peer can use static cryptographic keying schemes. For example, a communication system can include one or more servers such as an ADOBE® FLASH® Media Interactive Server (FMS) and one or more clients such as an ADOBE® FLASH® Player; an FMS can use an ephemeral public key and a Player client can use a static public key.

The present disclosure can allow an endpoint in a communication system to use one or more cryptographic schemes that are best suited for the endpoint's operational role and interoperate with different or same cryptographic schemes of other endpoints. For example, a peer endpoint using a static scheme can communicate with server and peer endpoints using a different scheme such as an ephemeral scheme. Likewise, a server endpoint using one scheme can communicate with client and peer endpoints using a different scheme.

Endpoints can be associated with identifying information such as a certificate. The certificate can specify, either implicitly or explicitly, a cryptographic scheme. In static keying, a certificate can include a public key such as a DH public key. A lack of a public key in a certificate can be indicative of an ephemeral keying scheme. In some implementations, an endpoint certificate can be represented by a block of data. The block of data can be formatted using an ad-hoc format or a standard format such as X.509. An ad-hoc format can use one or more sequences of length, tag, and value units. In some implementations, a certificate can include a signature. A signature can include a hash of at least a portion of the data in the certificate or can include a hash of a public key. In some implementations, a signature can be generated from at least a portion of a certificate by using a public key cryptosystem such as the RSA digital signature scheme. Hashing algorithms such as those specified by The Federal Information Processing Standard 180-2 "Secure Hash Standard" can be used to produce hashes. For example, SHA-256 can be used to produce a 256-bit hash. In some implementations, two endpoints of a transaction or a connection can use different certificate formats.

Endpoints can be represented by identity objects to other endpoints of the system. Endpoints of a connection establishment transaction can use and/or exchange endpoint identity objects or data structures generated from identity objects. An identity object can be derived from a cryptographic hash, such as SHA-256, or fingerprint of at least a portion of an endpoint's identifying information such as a certificate. In some implementations, an endpoint can use multiple schemes and certificate formats and therefore have multiple identity objects. Regardless of a certificate format or a cryptographic scheme used therein, certificates can be converted, e.g., hashed, into identity objects. A hash field of an identity object can be of a fixed length, e.g. the length can be 256 bits for SHA-256. By using a common space for certificates to hash into, identity objects can interoperate and endpoints of a communication system can process these identity objects.

An endpoint's identity object as retrieved from a third party can be used to authenticate an endpoint in a connection establishment transaction. For example, a certificate received from an endpoint can be hashed and compared to the identity object for the endpoint. A comparison match can be indicative of a positive authentication of the endpoint. Such use of an identity object can reduce computational overhead in an authentication process.

An endpoint that initiates a connection establishment transaction can use an endpoint discriminator to address another endpoint in a communication system. In some implementations, an endpoint discriminator can be a block of data formatted in a sequence of length, tag, and value units. The endpoint discriminator can include one or more attributes of an endpoint. Endpoint attributes can include an identity object that corresponds to a certificate of the endpoint, an indication that the endpoint must be of a specified type such as a server, and/or a name of the desired endpoint. For example, the endpoint discriminator can specify that any server can be the other endpoint of a connection.

Figure 1:
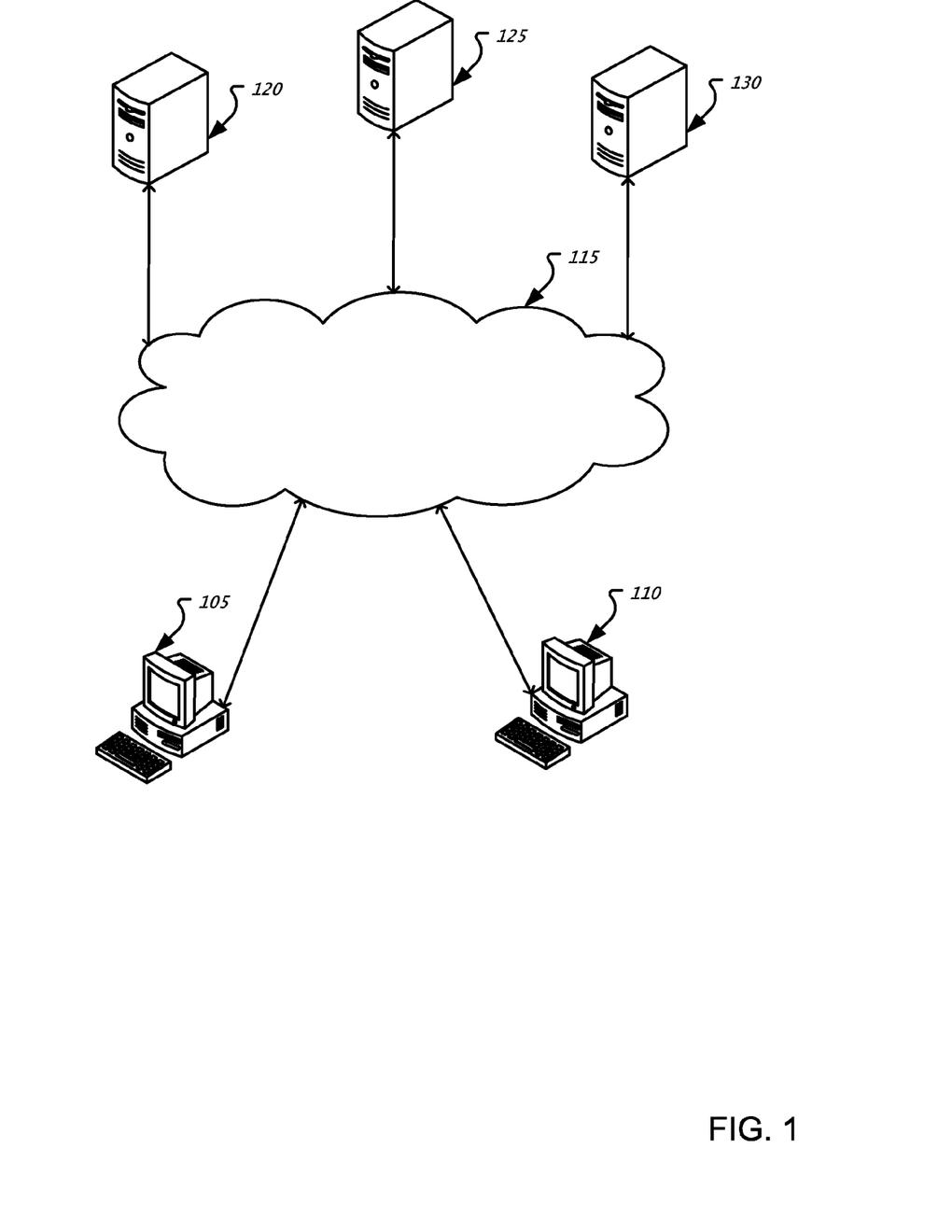
FIG. 1 shows an example of a communication network connected with computing devices.

FIG. 1 shows an example of a communication network connected with computing devices. Endpoints can include computing devices such as computers 105, 110 and servers 120, 125. An endpoint can include one or more processors that can be programmed or configured to perform one or more operations mentioned in the present disclosure. In some implementations, a processor can include multiple processors or processor cores. The endpoints 105, 110, 120, 125 can connect to a communication network 115 such as the Internet or a Local Area Network (LAN). Each of the computing devices can be identified as a peer, a server, or both. A peer can refer to a client or a server. Servers 120, 125 can establish connections with other servers 120, 125 or with computers 105, 110. Computers 105, 110 can establish connections with other computers 105, 110 or with servers 120, 125. In some implementations, messages to establish connections between devices 105, 110, 120, 125 can be transported between endpoints using the User Datagram Protocol (UDP) over the Internet Protocol (IP). An identity server, such as server 130, can also be connected to network 115. In some implementations, an identity server can be a part of a presence management system.

Each endpoint can generate one or more certificates. Certificates can be generated automatically or generated using information from a configuration file. Identity objects for each certificate can be created and sent to an identity server 130 with information identifying the name and/or type of the endpoint. In some implementations, a group of servers can share a certificate, in which case the endpoint name can collectively refer to the group.

Two endpoints in a communication system can exchange connection establishment messages. The two endpoints can include an initiator and a responder. The initiator can select an endpoint to be a responder. The initiator can obtain an identity object and an associated network address or addresses for the responder endpoint.

In some implementations, the identity object can be retrieved from an identity server 130 when a corresponding name is submitted to the identity server 130. In implementations where the identity server 130 offers a presence service, a first user can log into the presence service. The service can create a mapping from a persistent username of the first user to an identity object. A second user that desires to contact the first user by username can query the presence service with the username and retrieve the identity object.

An endpoint discriminator can be generated from the identity object. The initiator can send a message that includes the endpoint discriminator to the responder. Once received, a responder endpoint can process the endpoint discriminator of the message to determine if the endpoint is an appropriate responder. The responder can send a message that includes a certificate of the responder to the initiator. The certificate can include a public key for static keying or a lack thereof for ephemeral keying. The responder can select a certificate based on the endpoint discriminator.

After the initiator receives the message with the certificate, the certificate can be translated into either an identity object or an endpoint discriminator, each of which can be used for comparison or indexing purposes. For example, an initiator can determine to continue with the connection establishment based on having a hash of the received certificate match the identity object used in the endpoint discriminator of the initial message sent by the initiator.

In continuing the connection establishment, the initiator can send a message that includes a certificate of the initiator and keying information. The certificate of the initiator can include a static public key for static keying or a lack thereof for ephemeral keying. Keying information can include an ephemeral public key or information for use with a static key. In some implementations the keying information can include proof that a shared secret is known for cryptographic schemes that have a shared secret.

After the responder receives the message with the certificate of the initiator, the certificate can be translated into either an identity object or an endpoint discriminator, each of which can be used for comparison or indexing purposes. The identity object from the translation can be compared against known identity objects for the initiator to determine the authenticity of the initiator in the connection establishment messages. The responder can send a message that includes keying information of the responder.

An endpoint can establish a connection with another endpoint by exchanging connection establishment messages. In some implementations, the message types can include Initiator Hello, Responder Hello, Initiator Initial Keying, and Responder Initial Keying. A connection establishment message can include one or more data fields.

An endpoint such as computer 105 can send to another endpoint such as server 120 an Initiator Hello message. An Initiator Hello message can include an endpoint discriminator. The server 120 can respond by sending a Responder Hello message to computer 105. A Responder Hello message can include a Responder Certificate. After receiving the response from server 120, computer 105 can translate the Responder Certificate into either an identity object or an endpoint discriminator to match against the endpoint discriminator of the Initiator Hello message. After performing and detecting a match, computer 105 can send an Initiator Initial Keying message to server 120. An Initiator Initial Keying message can include an Initiator Certificate, Session Key Initiator Component, and a Signature. After receiving the Initiator Initial Keying message, server 120 can send a Responder Initial Keying message to computer 105. A Responder Initial Keying message can include a Session Key Responder Component and a Signature. In some implementations, a certificate, a Session Key Initiator Component, and/or Session Key Responder Component can each be a list of attributes that can be stored as length/tag/value units.

If an endpoint's certificate, such as either a responder or initiator certificate, indicates a cryptographic scheme including ephemeral public keying, the endpoint can generate a new, ephemeral, public key for a specified connection. For example, the endpoint can use a cryptographic scheme such as DH or RSA to generate an ephemeral public key and a corresponding private key. The endpoint can generate a certificate for ephemeral public keying. The certificate can include an attribute specifying a scheme such as DH or RSA. The certificate can include a cryptographically strong random number. The inclusion of a random number in a certificate can produce a distinctive identity object for an endpoint. For example, a certificate for a server indicating ephemeral public keying can be identical to another server's certificate; the inclusion of a random number in a certificate can produce a different hash and identity object thereof. Additional attributes can be added to the certificate to indicate other capabilities of the endpoint. The lack of a public key in a certificate can be indicative of an endpoint's desire to perform ephemeral public keying. However, the desire to perform such keying can be made explicit by using a certificate attribute. In some implementations, the endpoint can include the ephemeral public key in the Session Key Initiator Component if the endpoint is the initiator or in the Session Key Responder Component if the endpoint is the responder.

An endpoint using static keying for either a responder or initiator certificate can use a cryptographic keying scheme such as DH or RSA to generate a static public key and a corresponding private key. The static public key can be generated in advance of a connection establishment transaction and can be used for multiple transactions. The endpoint can generate a certificate by including the static public key as an attribute of the certificate. In some implementations, a certificate can include an attribute representing the cryptographic scheme and a tag to indicate that the certificate contains a public key. Other attributes can be added to the certificate to indicate other capabilities of the endpoint. In some implementations, the endpoint can include a cryptographically strong random number as a keying salt in the Session Key Initiator Component if the endpoint is the initiator or in the Session Key Responder Component if the endpoint is the responder.

Figure 2:
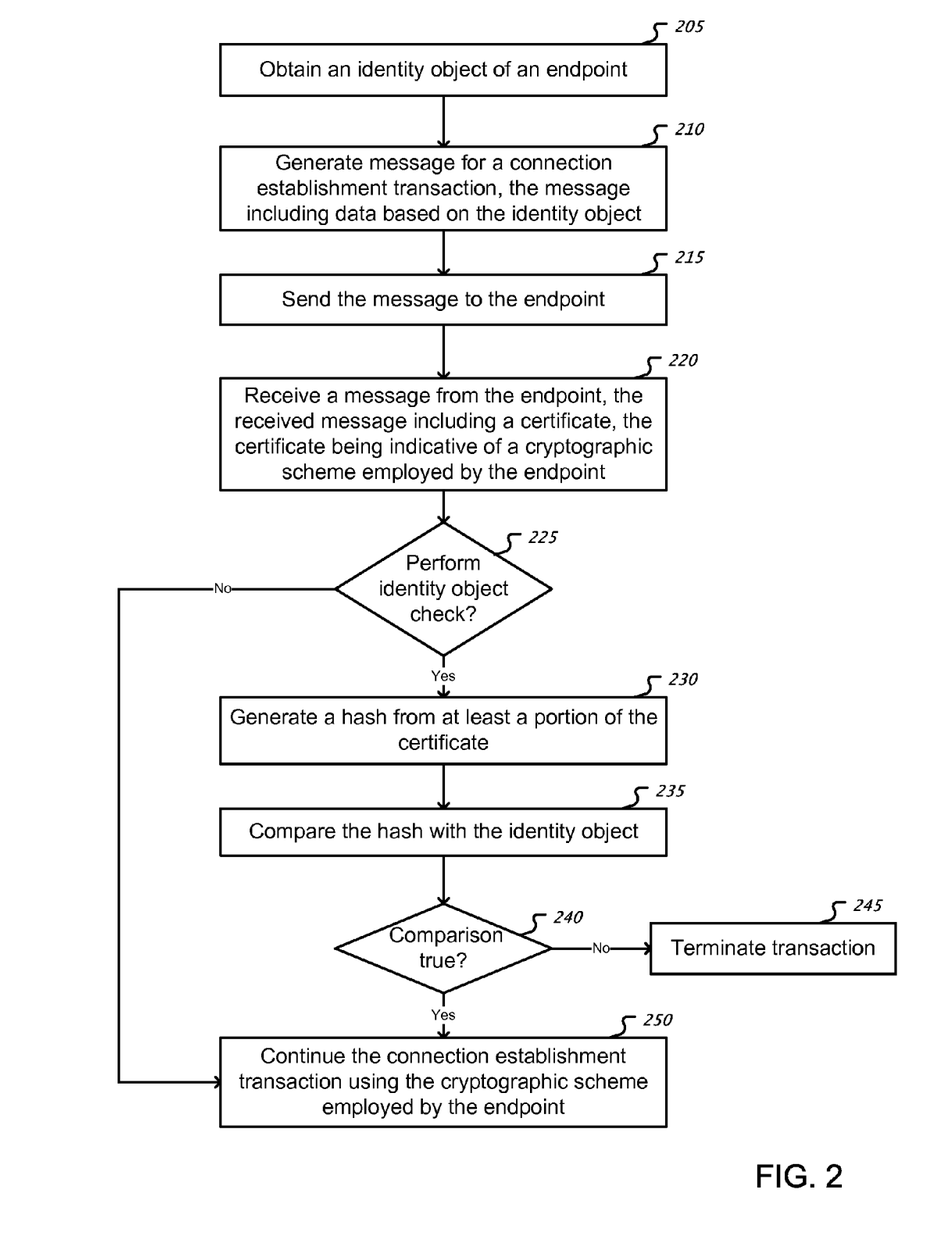
FIG. 2 shows an example of a connection establishment transaction from an initiator's viewpoint.

FIG. 2 shows an example of a connection establishment transaction from an initiator's viewpoint. An initiator such as computer 105 or server 120 can obtain 205 an identity object of an endpoint from either an identity server such as server 130 or from a digital store medium. A message for a connection establishment transaction can be generated 210. The message can include data based on the identity object such as an endpoint discriminator that includes the identity object. The initiator can send 215 the message to the endpoint and receive 220 a message from the endpoint in response to the sent message. The received message can include a certificate. The certificate can be indicative of a cryptographic keying scheme employed by the endpoint.

The initiator can perform 225 an identity object check. The decision to perform a check can be user configurable, determined by a process, or specified by a configuration file. If the check is not to be performed, the transaction can continue 250. In performing the check, a hash can be generated 230 from at least a portion of the certificate. In some implementations, the initiator can use SHA-256 to generate the hash. The hash can be compared 235 with the identity object. If the comparison is true 240, then the connection establishment transaction can continue 250. The initiator can use the cryptographic scheme employed by the endpoint to continue with the transaction. For example, the cryptographic scheme can indicate that a static public key for the endpoint is included in the certificate. In another example, the cryptographic keying scheme can indicate that the endpoint will generate an ephemeral public key; the ephemeral public key of the endpoint can be sent in a subsequent message of the transaction. The initiator can select a cryptographic keying scheme and send a certificate including the scheme indication to the opposing endpoint. In some implementations, the opposing endpoint can perform one or more tasks similar to those shown in FIG. 2 The cryptographic scheme of the initiator can be different from the cryptographic scheme of the responder.

Figure 3:
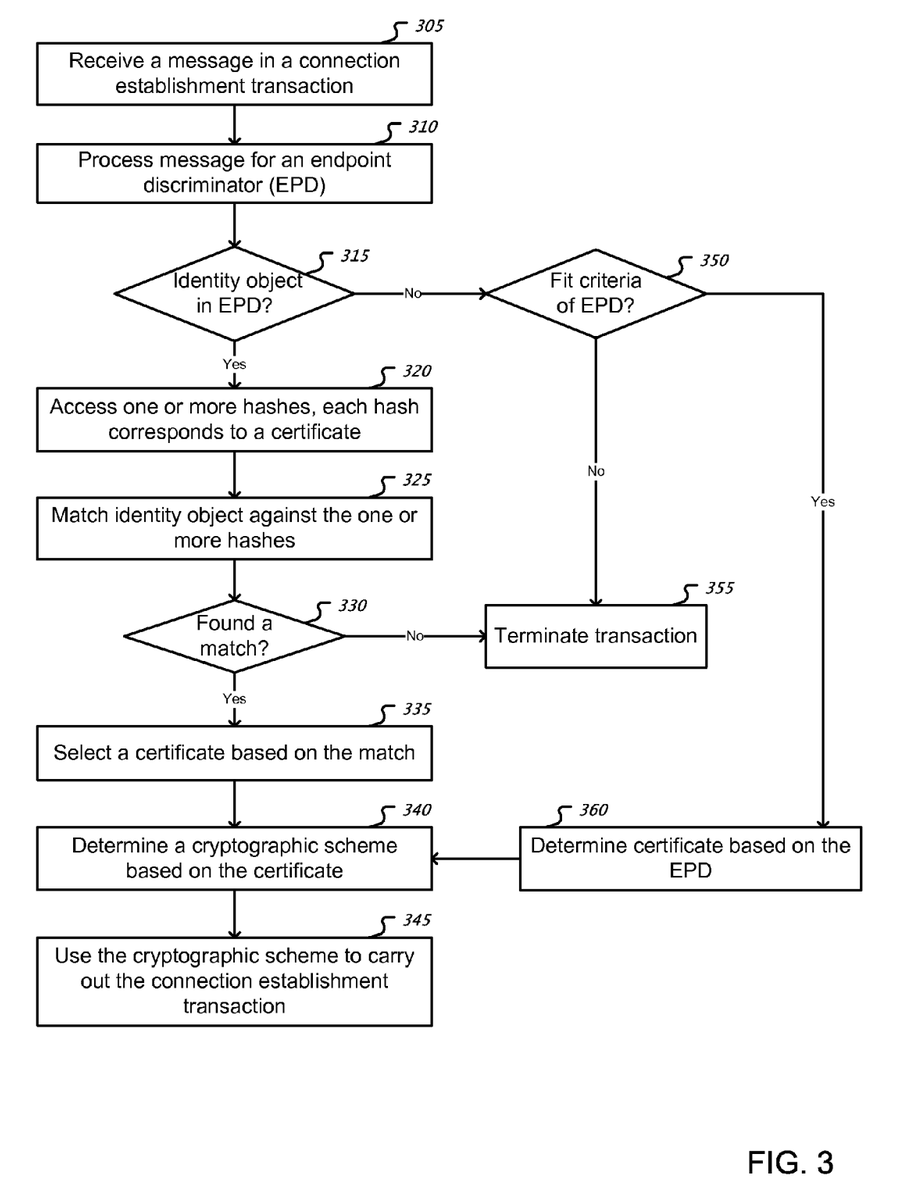
FIG. 3 shows an example of a connection establishment transaction from a responder's viewpoint.

FIG. 3 shows an example of a connection establishment transaction from a responder's viewpoint. A responder such as computer 105 or server 120 can receive 305 a message in a connection establishment transaction. The message can be processed 310 for an endpoint discriminator (EPD). If the EPD includes an identity object 315, then one or more hashes can be accessed 320. Each hash can correspond to a certificate. In some implementations, a hashing algorithm can be employed to produce a hash of at least a portion of a certificate. The responder can match 325 the identity against the one or more hashes. If a match is found 330, then the responder can select 335 a certificate based on the match. If a match is not found 330, then the transaction can be terminated 355.

If the EPD does not include an identity object 315, then the responder can determine if the responder fits 350 criteria set forth in the EPD. For example, one of the criteria can be that the responder is of a specified type such as a server. If the responder fits 350 the criteria, then the responder can determine a certificate based on the EPD 360. For example, the certificate can include an attribute stating that the responder is a server. If the responder does not fit criteria 350, then the transaction can be terminated 355.

The responder can determine 340 a cryptographic scheme based on the certificate. The responder can use 345 the cryptographic scheme to carry out the connection establishment transaction. In some implementations, the opposing endpoint can perform one or more tasks similar to those shown in FIG. 3. The cryptographic scheme of the initiator can be different from the cryptographic scheme of the responder.

Figure 4:
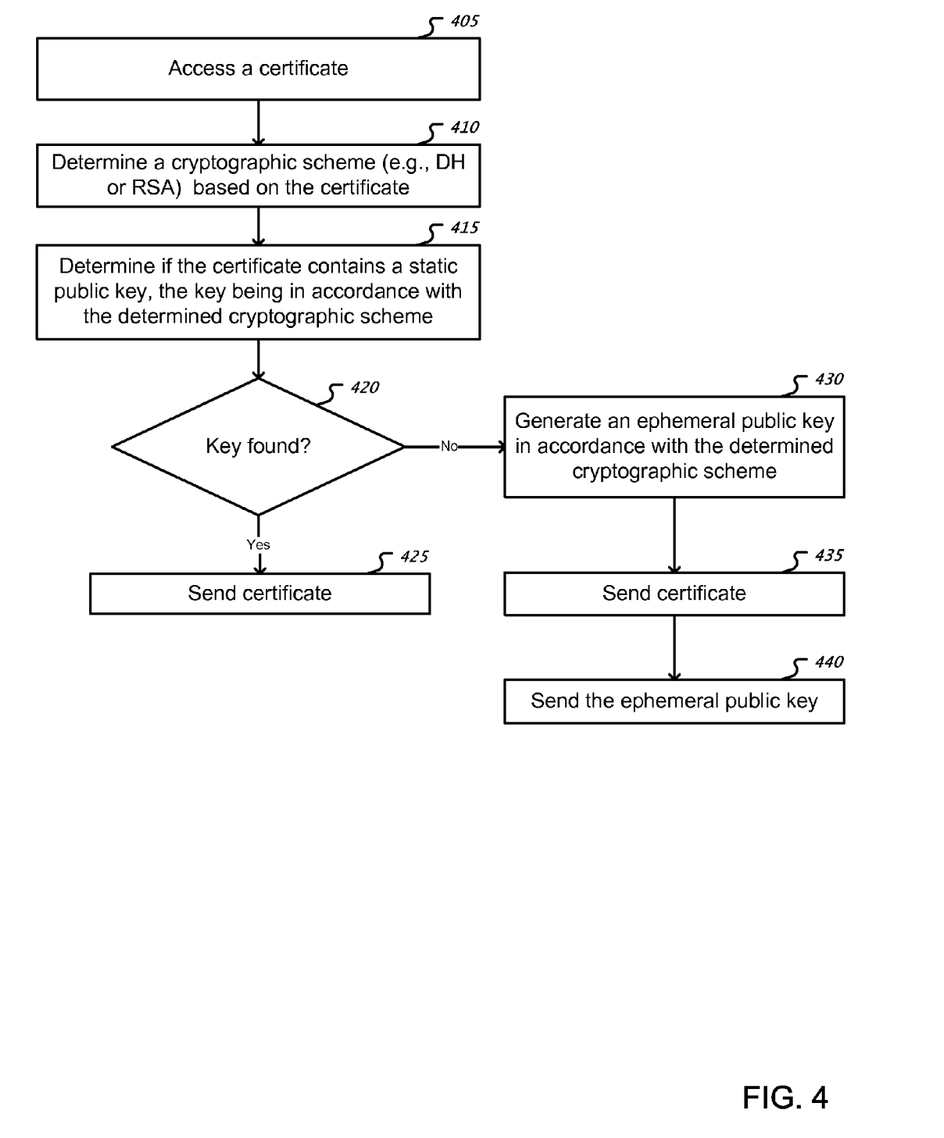
FIG. 4 shows an example of accessing a certificate for key information.

FIG. 4 shows an example of accessing a certificate for key information. An endpoint can access 405 a certificate. The certificate can be processed to determine 410 a cryptographic scheme, e.g., DH or RSA, based on the certificate. The certificate can be processed to determine 415 if the certificate contains a static public key, the key being in accordance with the determined cryptographic scheme. If a static public key is found 420, then the certificate can be sent 425 to another endpoint. If a static public key is not found 420, then an ephemeral public key in accordance with the determined cryptographic scheme can be generated 530. The certificate 425 and the ephemeral public key can be sent 435, 440 to another endpoint.

Figure 5:
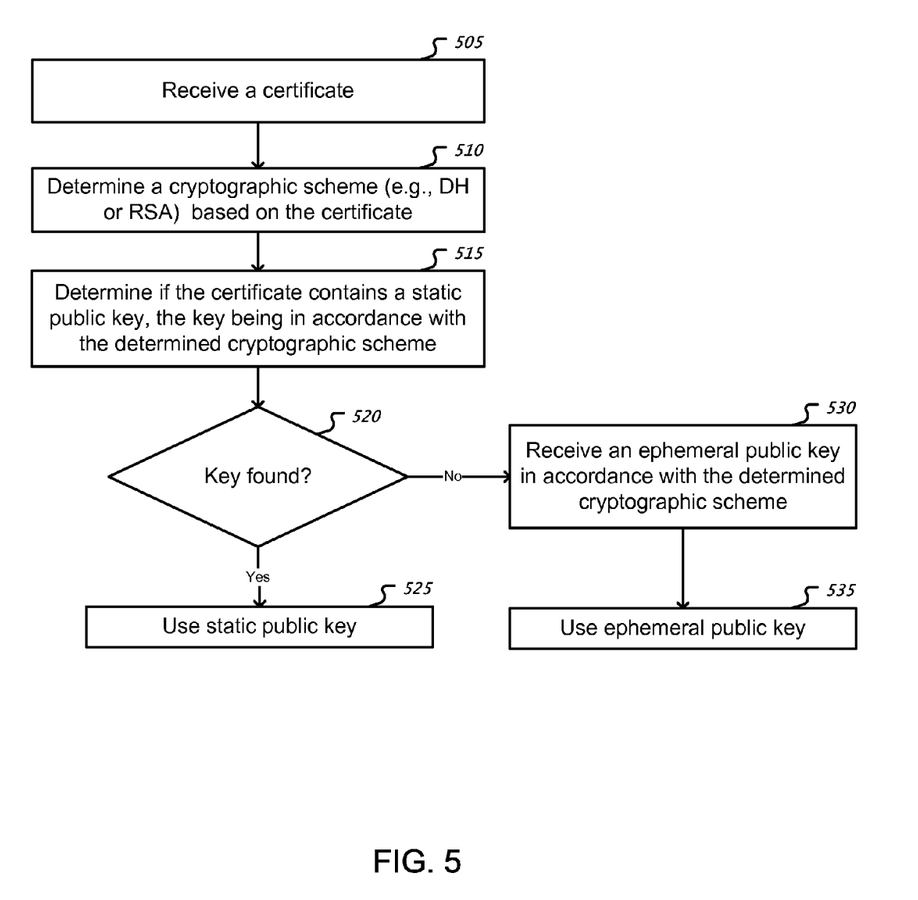
FIG. 5 shows an example of receiving and processing a certificate.

FIG. 5 shows an example of receiving and processing a certificate. A certificate can be received 505. The certificate can be processed to determine 510 a cryptographic scheme, e.g., DH or RSA, based on the certificate. The certificate can be processed to determine 515 if the certificate contains a static public key, the key being in accordance with the determined cryptographic scheme. If a static public key is found 520, then the static public key can be used 525. If a static public key is not found 520, then an ephemeral public key in accordance with the determined cryptographic scheme can be received 530 and subsequently can be used 535.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, mechanical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, near-touch input, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method implemented by a first endpoint, the first endpoint comprising a data processing apparatus, the method comprising:
    receiving a message, in a connection establishment transaction, from a second endpoint, the message comprising an endpoint discriminator that is based on an identity object;
    selecting a certificate based on one or more attributes of the endpoint discriminator;
    determining a cryptographic scheme based on the selected certificate; and
    establishing the requested connection with the second endpoint using the selected certificate and the determined cryptographic scheme, wherein the establishing comprises:
        selectively using a key associated with a static public key when the selected certificate includes the static public key, the static public key being in accordance with the determined cryptographic scheme;
        selectively generating an ephemeral public key in accordance with the determined cryptographic scheme when the selected certificate does not include a static public key; and
        selectively sending the ephemeral public key to the second endpoint when the selected certificate does not include a static public key.

2. The method of claim 1, the selecting comprising:
    accessing one or more hashes, each hash being a hash of at least a portion of a certificate;
    processing the endpoint discriminator for the identity object; and
    comparing the identity object with the one or more hashes to identify a matching hash, wherein the selected certificate corresponds to the matching hash.

3. The method of claim 1, wherein the determined cryptographic scheme comprises Diffie-Hellman key agreement or Rivest Shamir Adleman (RSA) key agreement.

4. A method implemented by a first endpoint, the first endpoint comprising a data processing apparatus, the method comprising:
    obtaining an identity object of a second endpoint;
    generating an endpoint discriminator comprising the identity object;
    generating a message for a connection establishment transaction, the message comprising the endpoint discriminator, the message causing the second endpoint to select a certificate according to one or more attributes of the endpoint discriminator;

sending the message to the second endpoint;

receiving a message from the second endpoint in response to the sent message, the received message comprising the certificate, the certificate being indicative of a cryptographic scheme employed by the second endpoint;

determining, at the first endpoint, whether the certificate was selected by the second endpoint according to the one or more attributes of the endpoint discriminator; and continuing, based on a result of the determining, the connection establishment transaction using the certificate and the cryptographic scheme employed by the second endpoint, wherein the continuing comprises selectively receiving an ephemeral public key from the second endpoint, the ephemeral public key being in accordance with the cryptographic scheme.

5. The method of claim 4, wherein determining whether the certificate was selected by the second endpoint according to the one or more attributes of the endpoint discriminator comprises:

generating a hash from at least a portion of the certificate; and comparing the hash with the identity object, wherein the continuing is conditioned upon a result of the comparison.

6. The method of claim 4, wherein the determined cryptographic scheme comprises Diffie-Hellman key agreement or Rivest Shamir Adleman (RSA) key agreement.

7. A computer program product, encoded on a non-transitory computer-readable medium, operable to cause data processing apparatus to perform operations comprising:

receiving a message, in a connection establishment transaction, from an endpoint, the message comprising an endpoint discriminator that is based on an identity object;

selecting a certificate based on one or more attributes of the endpoint discriminator;

determining a cryptographic scheme based on the selected certificate; and establishing the requested connection with the endpoint using the selected certificate and the determined cryptographic scheme, wherein the establishing comprises:

selectively using a key associated with a static public key when the selected certificate includes the static public key, the static public key being in accordance with the determined cryptographic scheme;

selectively generating an ephemeral public key in accordance with the determined cryptographic scheme when the selected certificate does not include a static public key; and selectively sending the ephemeral public key to the second endpoint when the selected certificate does not include a static public key.

8. The computer program product of claim 7, the selecting comprising:

accessing one or more hashes, each hash being a hash of at least a portion of a certificate;

processing the endpoint discriminator for the identity object; and comparing the identity object with the one or more hashes to identify a matching hash, wherein the selected certificate corresponds to the matching hash.

9. The computer program product of claim 7, wherein the determined cryptographic scheme comprises Diffie-Hellman key agreement or Rivest Shamir Adleman (RSA) key agreement.

10. A computer program product, encoded on a non-transitory computer-readable medium, operable to cause data processing apparatus to perform operations comprising:

obtaining an identity object of an endpoint;

generating an endpoint discriminator comprising the identity object;

generating a message for a connection establishment transaction, the message comprising the endpoint discriminator, the message causing the endpoint to select a certificate according to one or more attributes of the endpoint discriminator;

sending the message to the endpoint;

receiving a message from the endpoint in response to the sent message, the received message comprising the certificate, the certificate being indicative of a cryptographic scheme employed by the endpoint;

determining whether the certificate was selected by the endpoint according to the one or more attributes of the endpoint discriminator; and continuing, based on a result of the determining, the connection establishment transaction using the certificate and the cryptographic scheme employed by the endpoint, wherein the continuing comprises selectively receiving an ephemeral public key from the endpoint, the ephemeral public key being in accordance with the cryptographic scheme.

11. The computer program product of claim 10, wherein determining whether the certificate was selected by the endpoint according to the one or more attributes of the endpoint discriminator comprises:

generating a hash from at least a portion of the certificate; and comparing the hash with the identity object, wherein the continuing is conditioned upon a result of the comparison.

12. The computer program product of claim 10, wherein the determined cryptographic scheme comprises Diffie-Hellman key agreement or Rivest Shamir Adleman (RSA) key agreement.

13. A system comprising:

a communication network;

a first endpoint communicatively coupled with the communication network, the first endpoint comprising a first processor; and a second endpoint communicatively coupled with the communication network, the second endpoint comprising a second processor, wherein the second processor is configured to perform operations comprising:

obtaining an identity object of the first endpoint;

generating an endpoint discriminator comprising the identity object;

generating a first message for a connection establishment transaction, the first message comprising the endpoint discriminator;

sending the first message to the first endpoint;

receiving a second message from the first endpoint in response to the first message, the second message comprising a certificate, the certificate being indicative of a cryptographic scheme employed by the first endpoint;

determining whether the certificate is selected by the first endpoint according to one or more attributes of the endpoint discriminator; and continuing, based on a result of the determining, the connection establishment transaction using the certificate and the cryptographic scheme employed by the first endpoint, wherein the first processor is configured to perform operations comprising:

receiving the first message, in the connection establishment transaction, from the second endpoint;

selecting the certificate based on the endpoint discriminator of the first message;

determining a cryptographic scheme based on the selected certificate; and establishing the requested connection with the second endpoint using the selected certificate and the determined cryptographic scheme, wherein the establishing comprises selectively generating an ephemeral public key in accordance with the determined cryptographic scheme and selectively sending the ephemeral public key to the second endpoint.

14. The system of claim 13, the selecting comprising:

accessing one or more hashes, each hash being a hash of at least a portion of a certificate;

processing the endpoint discriminator for an identity object; and comparing the identity object with the one or more hashes to identify a matching hash, wherein selecting the certificate comprises selecting a certificate that corresponds to the matching hash.

15. The system of claim 13, the establishing the requested connection comprising:

generating the ephemeral public key in accordance with the determined cryptographic scheme when the selected certificate does not include a static public key; and sending the ephemeral public key to the second endpoint when the selected certificate does not include a static public key.

16. The system of claim 13, wherein the determined cryptographic scheme comprises Diffie-Hellman key agreement or Rivest Shamir Adleman (RSA) key agreement.

17. The system of claim 13, wherein determining whether the certificate is selected by the first endpoint according to one or more attributes of the endpoint discriminator comprises:

generating a hash from at least a portion of the certificate of the second message; and comparing the hash with the obtained identity object, wherein the continuing is conditioned upon a result of the comparison.

* * * * *